(12) United States Patent
Ogren et al.

(10) Patent No.: US 9,798,096 B2
(45) Date of Patent: Oct. 24, 2017

(54) MANAGED FIBER CONNECTIVITY SYSTEMS

(71) Applicants: ADC Telecommunications, Inc., Berwyn, PA (US); Tyco Electronics UK Ltd., Swindon, Wiltshire (GB)

(72) Inventors: Bruce Ogren, Edina, MN (US); Rod Schoenfelder, Shakopee, MN (US); Christopher Charles Taylor, Cheltenham Glos (GB); Steven J. Brandt, Savage, MN (US)

(73) Assignees: COMMSCOPE TECHNOLOGIES LLC, Hickory, NC (US); COMMSCOPE CONNECTIVITY UK LIMITED (GB)

( * ) Notice: Subject to any disclaimer, the term of this patent is extended or adjusted under 35 U.S.C. 154(b) by 6 days.

(21) Appl. No.: 14/611,924

(22) Filed: Feb. 2, 2015

(65) Prior Publication Data
US 2015/0226926 A1 Aug. 13, 2015

Related U.S. Application Data

(60) Provisional application No. 61/937,374, filed on Feb. 7, 2014.

(51) Int. Cl.
*G02B 6/38* (2006.01)

(52) U.S. Cl.
CPC ......... *G02B 6/3895* (2013.01); *G02B 6/3825* (2013.01); *G02B 6/3831* (2013.01)

(58) Field of Classification Search
CPC ... G02B 6/3825; G02B 6/3831; G02B 6/3895
See application file for complete search history.

(56) References Cited

U.S. PATENT DOCUMENTS 4,953,194 A 8/1990 Hansen et al.
4,968,929 A 11/1990 Hauck et al.
(Continued)

FOREIGN PATENT DOCUMENTS

CN 101968558 A 2/2011
DE 41 14 921 A1 11/1992
(Continued)

OTHER PUBLICATIONS

International Search Report and Written Opinion for Application No. PCT/US015/014431 mailed May 21, 2015.
(Continued)

*Primary Examiner* — John M Bedtelyon
(74) *Attorney, Agent, or Firm* — Merchant & Gould P.C.

(57) ABSTRACT

An adapter block assembly includes at least one adapter block; a circuit board; a first contact set; and a second contact set. The contact sets are disposed at apertures defined in the adapter block and rotated 180° from each other. Each adapter block includes first and second latching arrangements that retain separately manufactured alignment arrangements against movement along the passages. The first latching arrangements include latching arms disposed at the apertures. The second latching arms include ramps and stops disposed opposite the apertures. Optical connectors suitable for plugging into the adapter block include an outer housing having an area of increased thickness of hold a storage device and an inner housing with a channel to accommodate the area of increased thickness of the outer housing.

11 Claims, 16 Drawing Sheets

(56) References Cited

U.S. PATENT DOCUMENTS

| | | | |
|---|---|---|---|
| 5,052,940 A | 10/1991 | Bengal | |
| 5,161,988 A | 11/1992 | Krupka | |
| 5,222,164 A | 6/1993 | Bass, Sr. et al. | |
| 5,305,405 A | 4/1994 | Emmons et al. | |
| 5,317,663 A | 5/1994 | Beard et al. | |
| 5,393,249 A | 2/1995 | Morgenstern et al. | |
| 5,394,503 A | 2/1995 | Dietz, Jr. et al. | |
| 5,413,494 A | 5/1995 | Dewey et al. | |
| 5,419,717 A | 5/1995 | Abendschein et al. | |
| 5,467,062 A | 11/1995 | Burroughs et al. | |
| 5,483,467 A | 1/1996 | Krupka et al. | |
| 5,579,425 A | 11/1996 | Lampert et al. | |
| 5,685,741 A | 11/1997 | Dewey et al. | |
| 5,821,510 A | 10/1998 | Cohen et al. | |
| 5,910,776 A | 6/1999 | Black | |
| 6,002,331 A | 12/1999 | Laor | |
| 6,116,961 A | 9/2000 | Henneberger et al. | |
| 6,222,908 B1 | 4/2001 | Bartolutti et al. | |
| 6,234,830 B1 | 5/2001 | Ensz et al. | |
| 6,285,293 B1 | 9/2001 | German et al. | |
| 6,300,877 B1 | 10/2001 | Schannach et al. | |
| 6,330,307 B1 | 12/2001 | Bloch et al. | |
| 6,350,148 B1 | 2/2002 | Bartolutti et al. | |
| 6,409,392 B1 | 6/2002 | Lampert et al. | |
| 6,424,710 B1 | 7/2002 | Bartolutti et al. | |
| 6,437,894 B1 | 8/2002 | Gilbert et al. | |
| 6,456,768 B1 | 9/2002 | Boncek et al. | |
| 6,499,861 B1 | 12/2002 | German et al. | |
| 6,511,231 B2 | 1/2003 | Lampert et al. | |
| 6,522,737 B1 | 2/2003 | Bartolutti et al. | |
| 6,574,586 B1 | 6/2003 | David et al. | |
| 6,636,152 B2 | 10/2003 | Schannach et al. | |
| 6,725,177 B2 | 4/2004 | David et al. | |
| 6,743,044 B2 | 6/2004 | Musolf et al. | |
| 6,802,735 B2 | 10/2004 | Pepe et al. | |
| 6,808,116 B1 | 10/2004 | Eslambolchi et al. | |
| 6,898,368 B2 | 5/2005 | Colombo et al. | |
| 6,905,363 B2 | 6/2005 | Musolf et al. | |
| 6,932,517 B2 | 8/2005 | Swayze et al. | |
| 6,971,895 B2 | 12/2005 | Sago et al. | |
| 7,081,808 B2 | 7/2006 | Colombo et al. | |
| 7,088,880 B1 | 8/2006 | Gershman | |
| 7,123,810 B2 | 10/2006 | Parrish | |
| 7,153,142 B2 | 12/2006 | Shifris et al. | |
| 7,165,728 B2 | 1/2007 | Durrant et al. | |
| 7,193,422 B2 | 3/2007 | Velleca et al. | |
| 7,210,858 B2 | 5/2007 | Sago et al | |
| 7,226,217 B1 | 6/2007 | Benton et al. | |
| 7,234,944 B2 | 6/2007 | Nordin et al. | |
| 7,297,018 B2 | 11/2007 | Caveney et al. | |
| 7,315,224 B2 | 1/2008 | Gurovich et al. | |
| 7,352,289 B1 | 4/2008 | Harris | |
| 7,356,208 B2 | 4/2008 | Becker | |
| 7,458,517 B2 | 12/2008 | Durrant et al. | |
| 7,519,000 B2 | 4/2009 | Caveney et al. | |
| 7,552,872 B2 | 6/2009 | Tokita et al. | |
| 7,869,426 B2 | 1/2011 | Hough et al. | |
| 7,872,738 B2 | 1/2011 | Abbott | |
| 7,934,022 B2 | 4/2011 | Velleca et al. | |
| 8,757,895 B2* | 6/2014 | Petersen | G02B 6/3817 385/147 |
| 9,244,229 B2 | 1/2016 | Petersen | |
| 2002/0081076 A1 | 6/2002 | Lampert et al. | |
| 2004/0052471 A1 | 3/2004 | Colombo et al. | |
| 2004/0054761 A1 | 3/2004 | Colombo et al. | |
| 2004/0117515 A1 | 6/2004 | Sago et al. | |
| 2004/0120657 A1 | 6/2004 | Sago et al. | |
| 2004/0240807 A1 | 12/2004 | Frohlich et al. | |
| 2005/0249477 A1 | 11/2005 | Parrish | |
| 2006/0160395 A1 | 7/2006 | Macauley et al. | |
| 2006/0193591 A1 | 8/2006 | Rapp et al. | |
| 2006/0228086 A1 | 10/2006 | Holmberg et al. | |
| 2007/0116411 A1 | 5/2007 | Benton et al. | |
| 2007/0237470 A1 | 10/2007 | Aronson et al. | |
| 2008/0100456 A1 | 5/2008 | Downie et al. | |
| 2008/0100467 A1 | 5/2008 | Downie et al. | |
| 2008/0131055 A1 | 6/2008 | Parkman et al. | |
| 2008/0175550 A1 | 7/2008 | Coburn et al. | |
| 2008/0310795 A1 | 12/2008 | Parkman, III et al. | |
| 2009/0034911 A1 | 2/2009 | Murano | |
| 2009/0123117 A1 | 5/2009 | Wang et al. | |
| 2010/0211664 A1 | 8/2010 | Raza et al. | |
| 2010/0211665 A1 | 8/2010 | Raza et al. | |
| 2010/0211697 A1 | 8/2010 | Raza et al. | |
| 2010/0215049 A1 | 8/2010 | Raza et al. | |
| 2011/0222819 A1 | 9/2011 | Anderson et al. | |
| 2011/0262077 A1 | 10/2011 | Anderson et al. | |
| 2012/0294572 A1* | 11/2012 | Petersen | G02B 6/3817 385/78 |
| 2014/0023326 A1 | 1/2014 | Anderson et al. | |
| 2014/0241692 A1 | 8/2014 | Petersen | |
| 2016/0139347 A1 | 5/2016 | Petersen | |

FOREIGN PATENT DOCUMENTS

| | | |
|---|---|---|
| DE | 102 44 304 | 3/2004 |
| DE | 10 2004 033 940 A1 | 2/2006 |
| EP | 1 199 586 A2 | 4/2002 |
| EP | 1 467 232 A1 | 10/2004 |
| EP | 1 662 287 A1 | 5/2006 |
| JP | 2004-151670 | 5/2004 |
| WO | WO 2007/061490 A2 | 5/2007 |
| WO | WO 2010/001400 A1 | 1/2010 |
| WO | WO 2010/121639 A1 | 10/2010 |

OTHER PUBLICATIONS

*Avaya's Enhanced SYSTIMAX® iPatch System Enables IT Managers to Optimise Network Efficiency and Cut Downtime*, Press Release, May 9, 2003, obtained from http://www.avaya.com/usa/about-avaya/newsroom/news-releases/2003/pr-030509 on Jan. 7, 2009.

*Avaya's Enhanced SYSTIMAX® iPatch System Enables IT Managers to Optimise Network Efficiency and Cut Downtime*, Press Release, May 20, 2003, obtained from http://www.avaya.com/usa/about-avaya/newsroom/news-releases/2003/pr-030520 on Jan. 7, 2009.

European Search Report for Application No. 12771750.2 mailed Sep. 1, 2014.

*Intelligent patching systems carving out a 'large' niche*, Cabling Installation & Maintenance, vol. 12, Issue 7, Jul. 2004 (5 pages).

*intelliMAC: The intelligent way to make Moves, Adds or Changes!* NORDX/CDT © 2003 (6 pages).

International Search Report and Written Opinion for PCT/US2012/033578 mailed Nov. 28, 2012.

Meredith, L., "Managers missing point of intelligent patching," *Daa Center News*, Jun. 21, 2005, obtained Dec. 2, 2008 from http://searchdatacenter.techtarget.com/news/article/0,289142,sid80_gci1099991,00.html.

Ohtsuki, F. et al., "Design of Optical Connectors with ID Modules," *Electronics and Communications in Japan*, Part 1, vol. 77, No. 2, pp. 94-105 (Feb. 1994).

*SYSTIMAX® iPatch System Wins Platinum Network of the Year Award*, Press Release, Jan. 30, 2003, obtained from http://www.avaya.com/usa/about-avaya/newsroom/news-releases/2003/pr-030130a on Jan. 7, 2009.

\* cited by examiner

MANAGED FIBER CONNECTIVITY SYSTEMS

CROSS-REFERENCE TO RELATED CASES

The present application claims the benefit of U.S. Provisional Application No. 61/937,374, filed Feb. 7, 2014, the disclosure of which is hereby incorporated herein by reference.

BACKGROUND

In communications infrastructure installations, a variety of communications devices can be used for switching, cross-connecting, and interconnecting communications signal transmission paths in a communications network. Some such communications devices are installed in one or more equipment racks to permit organized, high-density installations to be achieved in limited space available for equipment.

Communications devices can be organized into communications networks, which typically include numerous logical communication links between various items of equipment. Often a single logical communication link is implemented using several pieces of physical communication media. For example, a logical communication link between a computer and an inter-networking device such as a hub or router can be implemented as follows. A first cable connects the computer to a jack mounted in a wall. A second cable connects the wall-mounted jack to a port of a patch panel, and a third cable connects the inter-networking device to another port of a patch panel. A "patch cord" cross connects the two together. In other words, a single logical communication link is often implemented using several segments of physical communication media.

Network management systems (NMS) are typically aware of logical communication links that exist in a communications network, but typically do not have information about the specific physical layer media (e.g., the communications devices, cables, couplers, etc.) that are used to implement the logical communication links. Indeed, NMS systems typically do not have the ability to display or otherwise provide information about how logical communication links are implemented at the physical layer level.

SUMMARY

The present disclosure relates to communications connector assemblies and connector arrangements that provide physical layer management capabilities. In accordance with certain aspects, the disclosure relates to fiber optic connector assemblies and connector arrangements.

In accordance with some aspects of the disclosure, an adapter block assembly includes at least a first adapter block; a circuit board; a first contact set; and a second contact set. The first adapter block defines at least a first aperture providing access between a first passage and an exterior of the first adapter block. The circuit board extends across the first aperture. The contact sets are disposed at the first aperture. The second contact set has a second orientation that is rotated 180° from the first orientation.

In certain examples, the second contact set has an identical configuration to the first contact set. In certain examples, the widest point of the first contact set is laterally aligned with the narrowest point of the second contact set.

In certain examples, the adapter block defines a slotted region at each end of the aperture to inhibit lateral deflection between contact members of the contact sets. In certain examples, the slotted regions extend over less than a full width of the aperture. In an example, the slotted regions extend over less than half the width of the aperture.

In certain examples, the first side of the first adapter block defines multiple apertures; and the circuit board extends across the apertures. First and second contact sets are disposed in the apertures and have different orientations. In an example, the second contact set is rotated 180° from the first contact set.

In certain examples, the adapter block assembly also includes a second adapter block that is substantially identical to the first adapter block. In an example, the second adapter block is coupled to the same circuit board as the first adapter block.

In accordance with other aspects of the disclosure, the adapter block includes a body defining multiple passages. A first side of the body defines apertures aligned with the passageways. Each aperture extends along a majority of a width of the respective passageway. First latching arrangements are disposed at the first side of the body. Each first latching arrangement aligns with a respective one of the passageways. Second latching arrangements are disposed at the second side of the body. Each second latching arrangement is disposed within a respective one of the passageways. The first and second latching arrangements of each passage are configured to retain a separately manufactured alignment arrangement against movement along the axis of the respective passage.

In certain examples, each first latching arrangement includes a first latch arm and a second latch arm located at opposite ends of the respective aperture. In an example, the first and second latch arms of each first latching arrangement are configured to flex laterally along the aperture. In another example, the first and second latch arms of each first latching arrangement are configured to flex outwardly from the respective aperture away from the respective passage.

In certain examples, the body has a staggered configuration so that adjacent ports are offset from each other along the axes of the passageways. In certain examples, the apertures are disposed in a staggered configuration so that adjacent apertures are offset from each other along the axes of the passageways. In an example, the body is monolithically formed.

In certain examples, guide rails are disposed within each passageway. In an example, each guide rail has a tapered end.

In accordance with other aspects of the disclosure, a plug connector includes an outer housing; and an inner housing. The outer housing defines a passage therethrough and has a first side defining a storage mounting region towards the front of the outer housing. The first side has an increased thickness at the storage mounting region so that an inner surface of the first side extends into the passage at the storage mounting region. The outer housing defines a recessed surface having an open top at the storage mounting region. The inner housing is configured to slide along the passage of the outer housing. The inner housing defines a channel that accommodates the increased thickness of the first side of the outer housing at the storage mounting region.

In certain examples, a key is disposed on a second side of the outer housing opposite the first side. In certain examples, the inner surface of the first side of the outer housing extends into the passage at an angle.

In certain examples, the channel of the inner housing extends from an intermediate point along a first side of the inner housing to a first end of the inner housing.

In certain examples, a storage device is disposed at the recessed surface and is accessible through the open top of the recessed surface. In an example, a top surface of the storage device is no higher than an external surface of the first side. In certain examples, the storage device includes a circuit board having electrical contact pads accessible through the open top of the recessed surface. In certain examples, the storage device also includes electronic memory disposed on the circuit board. In certain examples, the recessed surface defines a second recessed surface that accommodates the electronic memory. In an example, the inner surface of the first side fully extends between the storage device and the inner housing.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
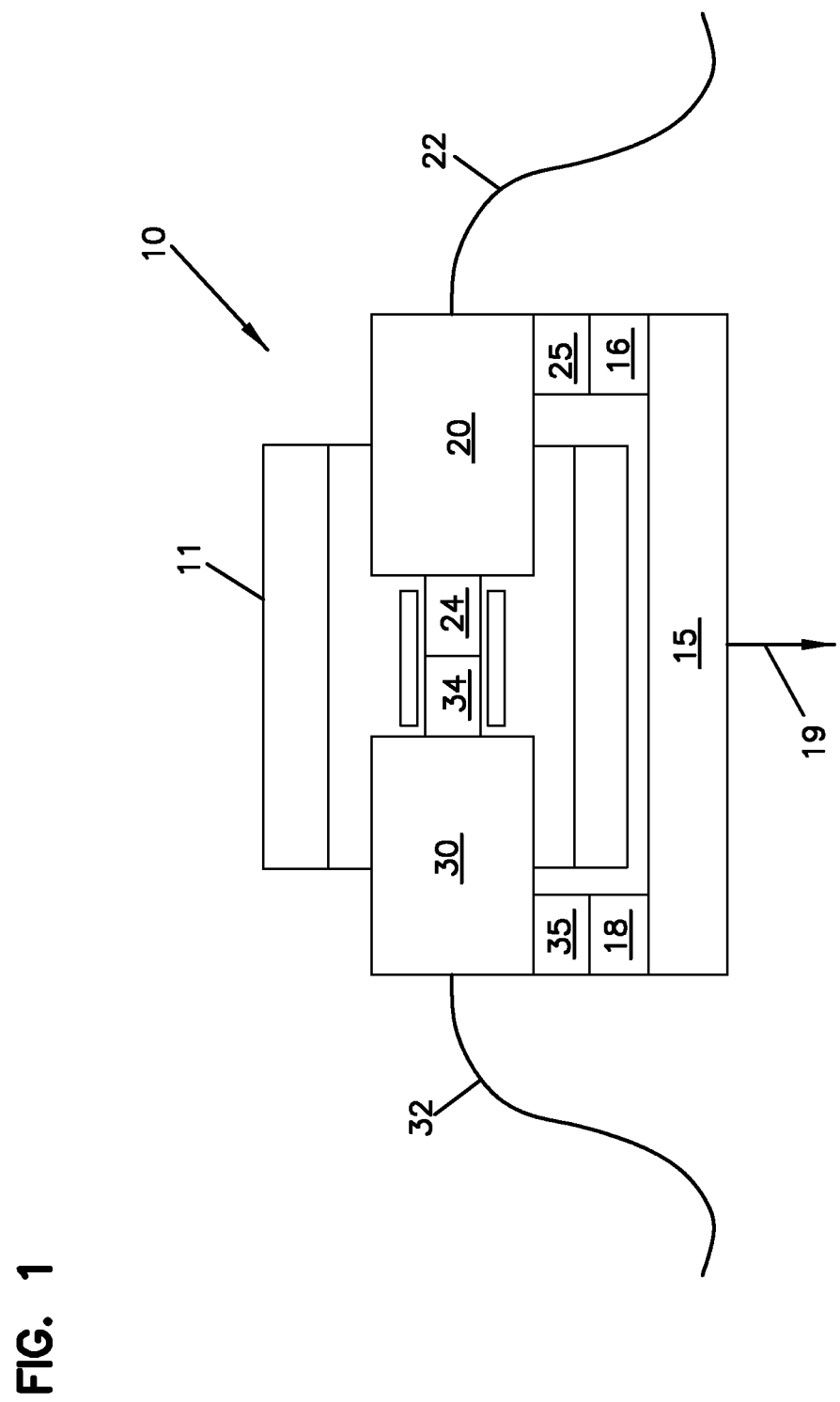
FIG. 1 is a schematic diagram showing two optical connectors with physical layer storage inserted at an optical adapter having media reading interfaces to access the physical layer storage of the connectors.
Figure 2:
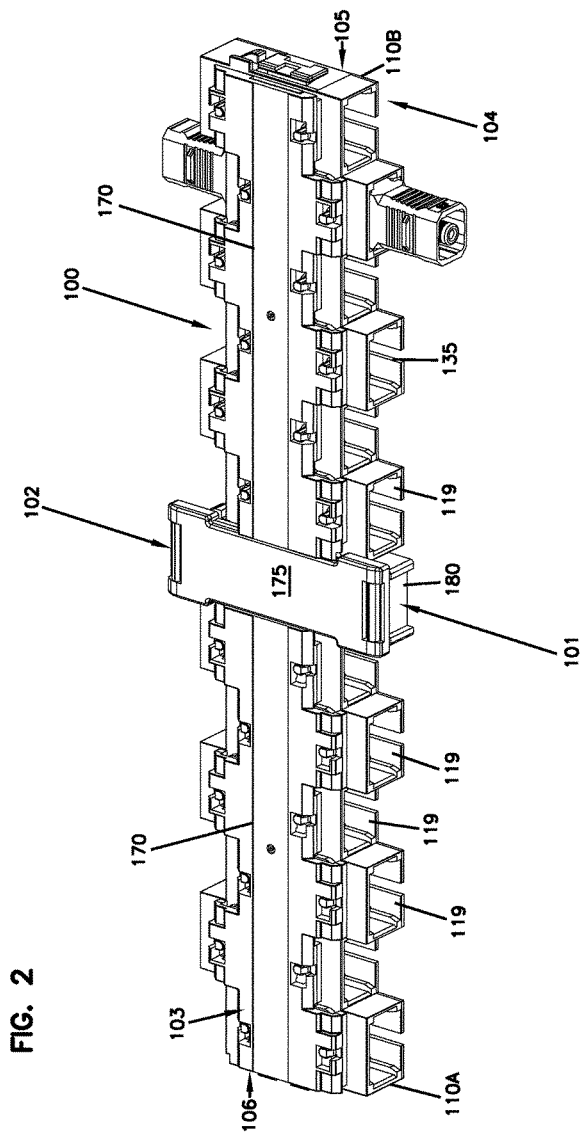
FIG. 2 is a perspective view of an example adapter block assembly in accordance with the principles of the present disclosure.

FIG. 1 is a schematic diagram of one example connection system 10 including an adapter block assembly (e.g., optical adapters, electrical sockets, wireless readers, etc.) 11 at which communications signals from a first media segment (e.g., an optical fiber, an electrical conductor, a wireless transceiver, etc.) 22 pass to another media segment 32. In some implementations, the media segments 22, 32 are terminated by connector arrangements 20, 30, respectively. The adapter block assembly 11 aligns the connector arrangement 20, 30 to allow optical signals to pass between the media segments 22, 32.

In accordance with aspects of the disclosure, the connection system 10 is coupled to or incorporates a data management system that provides physical layer information (PLI) functionality as well as physical layer management (PLM) functionality. As the term is used herein, "PLI functionality" refers to the ability of a physical component or system to identify or otherwise associate physical layer information with some or all of the physical components used to implement the physical layer of the communications network. As the term is used herein, "PLM functionality" refers to the ability of a component or system to manipulate or to enable others to manipulate the physical components used to implement the physical layer of the communications network (e.g., to track what is connected to each component, to trace connections that are made using the components, or to provide visual indications to a user at a selected component).

As the term is used herein, "physical layer information" refers to information about the identity, attributes, and/or status of the physical components used to implement the physical layer of the communications network. Physical layer information of the communications network can include media information, device information, and location information. Media information refers to physical layer information pertaining to cables, plugs, connectors, and other such physical media. Non-limiting examples of media information include a part number, a serial number, a plug type, a conductor type, a cable length, cable polarity, a cable pass-through capacity, a date of manufacture, a manufacturing lot number, the color or shape of the plug connector, an insertion count, and testing or performance information. Device information refers to physical layer information pertaining to the communications panels, inter-networking devices, media converters, computers, servers, wall outlets, and other physical communications devices to which the media segments attach. Location information refers to physical layer information pertaining to a physical layout of a building or buildings in which the network is deployed.

In accordance with some aspects, one or more of the components (e.g., media segments, equipment, etc.) of the communications network are configured to store physical layer information pertaining to the component as will be disclosed in more detail herein. Some components include media reading interfaces that are configured to read stored physical layer information from the components. The physical layer information obtained by the media reading interface may be communicated over the network for processing and/or storage.

For example, the adapter block assembly 11 of FIG. 1 can be configured to collect physical layer information from the connector arrangements 20, 30. The first connector arrangement 20 may include a storage device 25 that is configured to store physical layer information pertaining to the segment of physical communications media 22 and/or to the first connector arrangement 20. In certain implementations, the connector arrangement 30 also includes a storage device 35 that is configured to store information pertaining to the second connector arrangement 30 and/or to the second optic cable 32 terminated thereby. Each storage device 25, 35 is arranged and configured so that it does not interfere or interact with the communications signals communicated over the media segments 22, 32.

In accordance with some aspects, at least a first media reading interface 16 is disposed at the adapter 11 (e.g., mounted to a circuit board 15 coupled to the adapter 11). In certain implementations, at least a second media interface 18 also is disposed at the adapter 11 (e.g., mounted to a circuit board 15). When one of the connector arrangements 20, 30 is received at the adapter 11, the respective media reading interface 16, 18 is configured to enable reading (e.g., by an electronic processor) of the information stored in the respective storage device 25, 35. The information read from the connector arrangement 20, 30 can be transferred through the circuit board 15 to a physical layer data management network (e.g., see data line 19 of FIG. 1).

In some such implementations, the storage devices 25, 35 and the media reading interfaces 16, 18 each include at least three (3) leads—a power lead, a ground lead, and a data lead. The three leads of the storage devices 25, 35 come into electrical contact with three (3) corresponding leads of the media reading interfaces 16, 18 when the corresponding media segment is inserted in the corresponding port. In other example implementations, a two-line interface is used with a simple charge pump. In still other implementations, additional leads can be provided (e.g., for potential future applications). Accordingly, the storage devices 25, 35 and the media reading interfaces 16, 18 may each include four (4) leads, five (5) leads, six (6) leads, etc.

Examples of data management networks and examples of storage devices can be found in U.S. Provisional Application No. 61/760,816, filed Feb. 5, 2013, and titled "Systems and Methods for Associating Location Information with a Communication Sub-Assembly Housed within a Communication Assembly," the disclosure of which is hereby incorporated herein by reference.

FIGS. 2-8 illustrate an example adapter block assembly 100 suitable for implementing the adapter block assembly 11 of FIG. 1. The adapter block assembly 100 has a front 101, a rear 102, a first side 103, a second side 104, a first end 105, and a second end 106. The adapter block assembly 100 includes at least one adapter block 110, a circuit board 150, and a contact set 160 functioning as a media reading interface. Each adapter block 110 defines one or more passages 118 that each extend between front and rear ports 119. Each adapter block 110 defines a respective aperture 120 aligned with each passage 118 (see FIG. 4). One or more contact sets 160 align with the apertures 120 (e.g., see FIG. 7).

Figure 3:
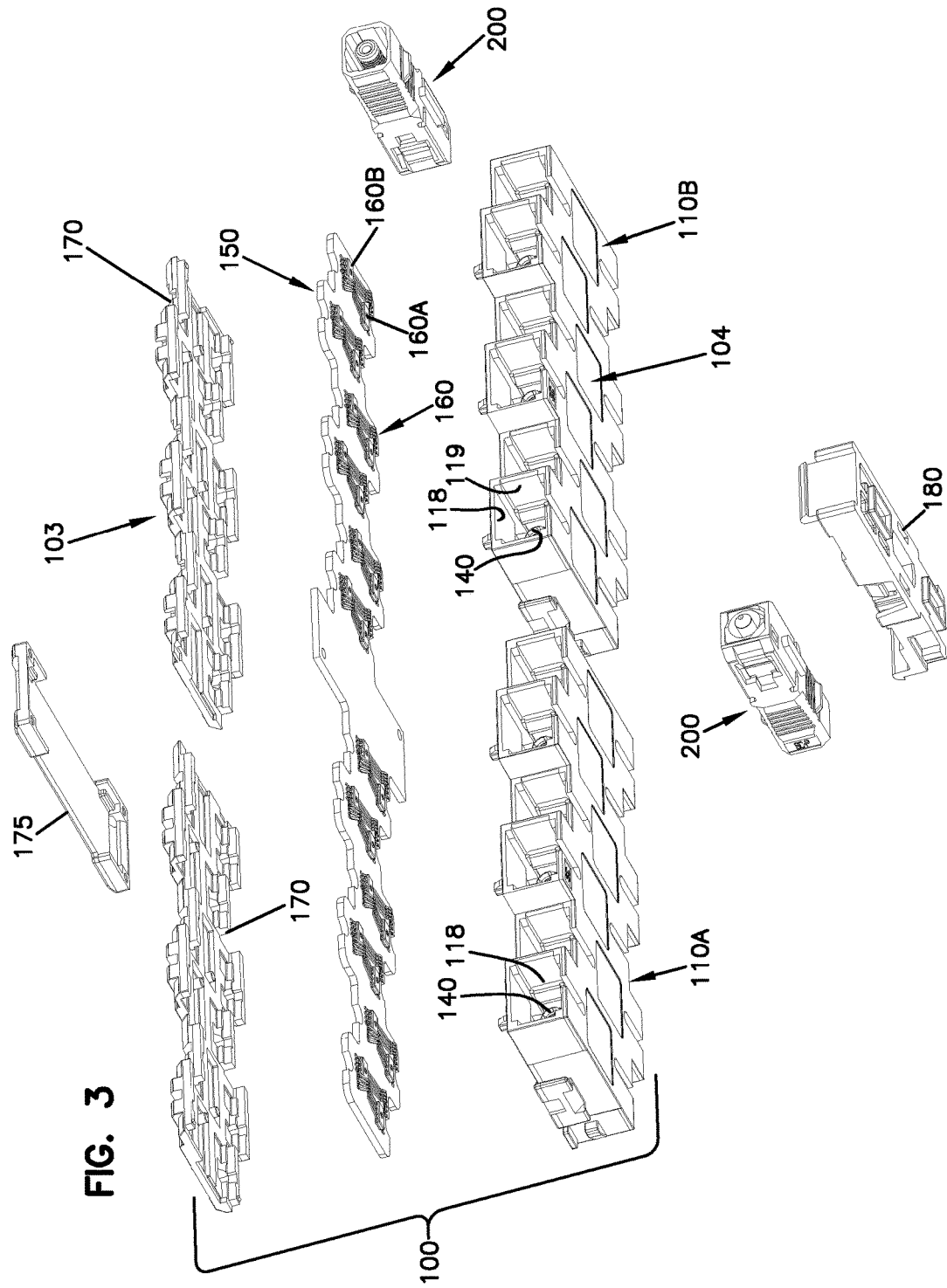
FIG. 3 is another perspective view of the adapter block assembly of FIG. 2 with the components exploded from each other.

In the example shown in FIG. 3, each aperture 120 aligns with two contact sets 160A, 160B disposed on the circuit board 150. In other implementations, each aperture 120 may align with one contact set 160 or no contact sets. In some implementations, the adapter block assembly 100 includes multiple adapter blocks. In the example shown in FIG. 3, two adapter blocks 110A, 110B are coupled to the circuit board 150. In other implementations, each adapter block 110A, 110B may have their own circuit board. In certain implementations, the adapter blocks 110A, 110B are coupled together by a joining member 180. In certain implementations, a cover arrangement 170, 175 is disposed over the circuit board 150 opposite the adapter blocks 110A, 110B.

Additional information regarding the joining member and cover arrangement can be found in U.S. Provisional Application No. 61/843,718, filed Jul. 8, 2013, and titled "Optical Assemblies with Managed Connectivity," the disclosure of which is hereby incorporated herein by reference.

Figure 4:
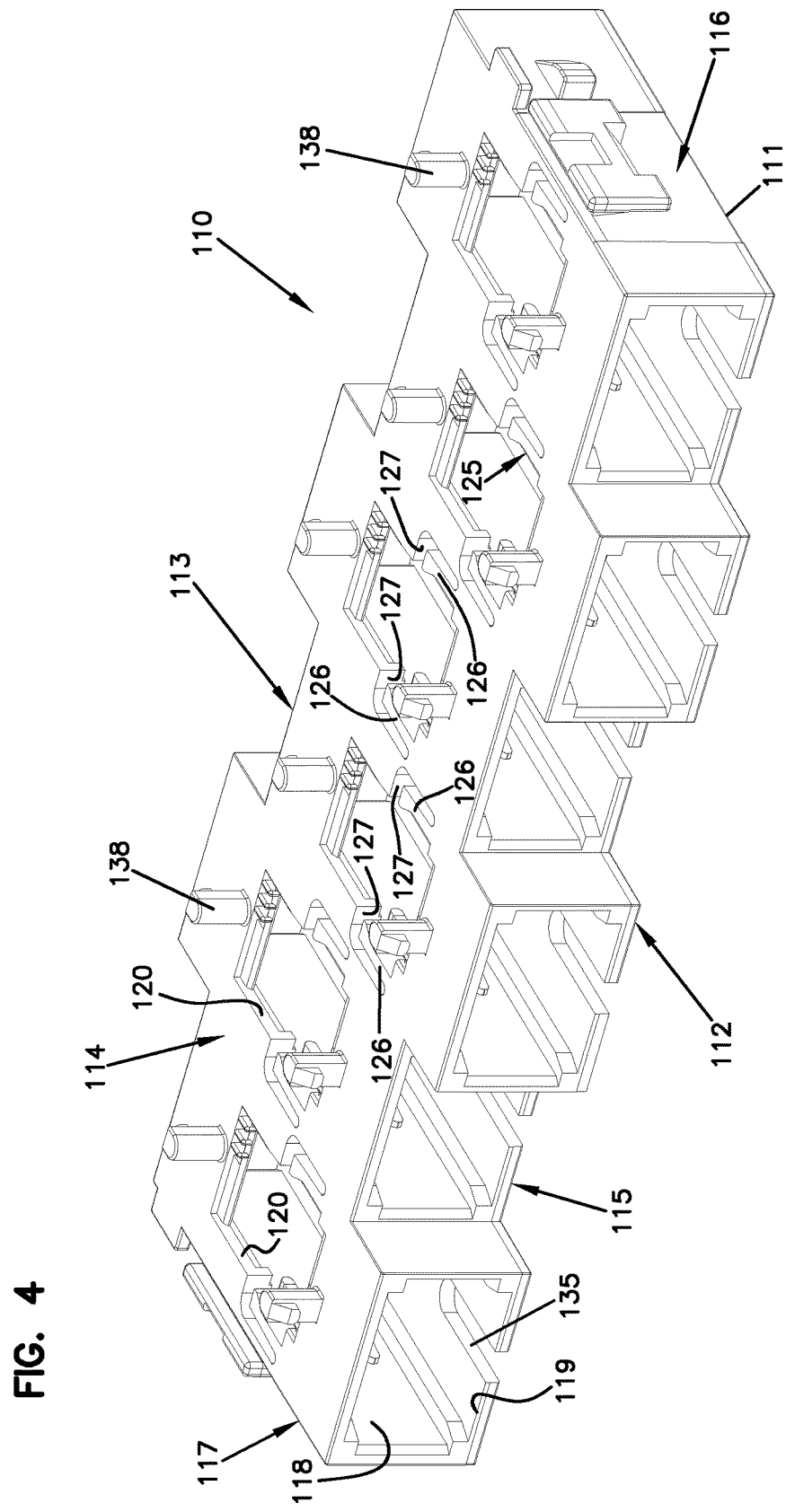
FIG. 4 is a perspective view of an example adapter block suitable for use in the adapter block assembly of FIG. 2.
Figure 5:
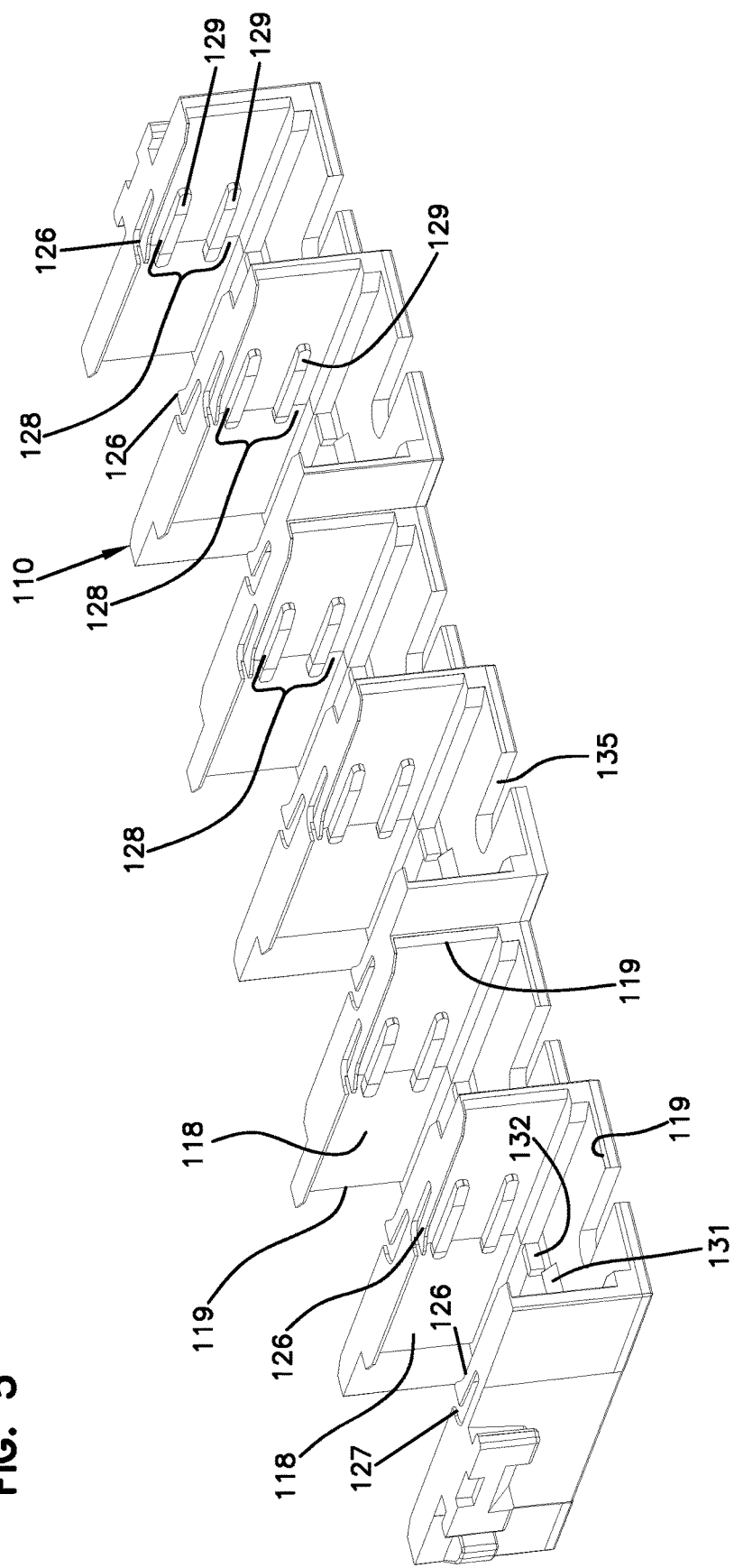
FIG. 5 is another perspective view of the adapter block of FIG. 4 with a first side of the adapter block removed to enable viewing of interior portions of the adapter block.
Figure 6:
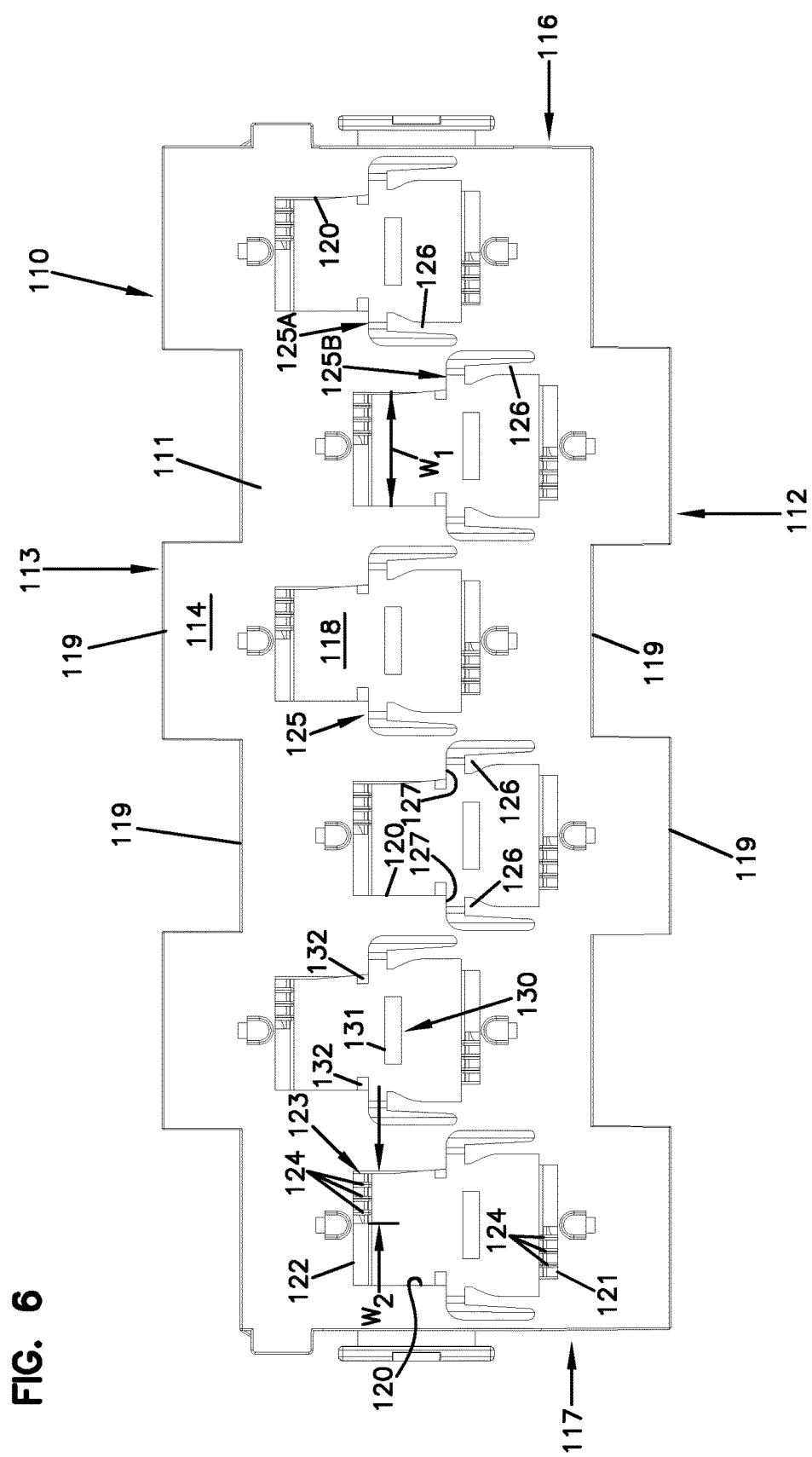
FIG. 6 is a top plan view of the adapter block of FIG. 4.
Figure 7:
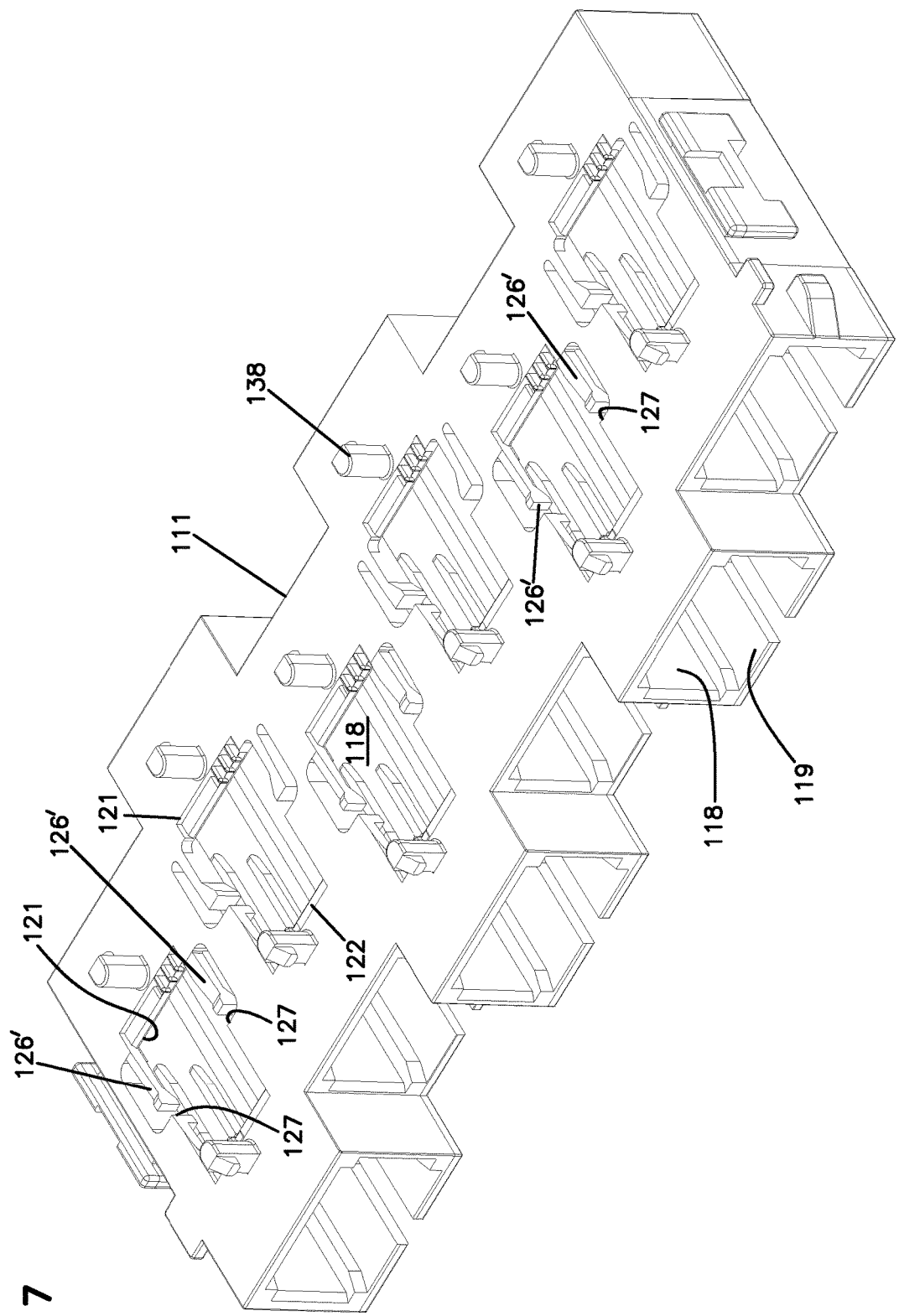
FIG. 7 is a perspective view of another example adapter block suitable for use in the adapter block assembly of FIG. 2.

FIGS. 4-6 illustrate one example adapter block 110 including a body 111 having a front 112, a rear 113, a first side 114, a second side 115, a first end 116, and a second end 117. Passages 118 extend through the body 111 between the front 112 and rear 113 of the body 111. Ports 119 for receiving optical connectors (e.g., optical connectors 200) are provided at opposite ends of each passage 118. In the example shown, the body 111 defines six passages 118. In other implementations, the body 111 may define a greater or lesser number of passages 118 (e.g., two, four, eight, ten, twelve, etc.).

The apertures 120 are defined at the first side 114 of the body 111. Each aperture 120 has a first end 121 located closer to the front 112 of the body 111 and a rear end 122 located closer to the rear 113 of the body 111 relative to each other. In certain implementations, retention arms 138 extend upwardly from the first side 114 to engage portions 170 of the cover arrangement. In the example shown, the retention arms 138 extend upwardly from opposite ends 121, 122 of each aperture 120. In certain implementations, keyways 135 are defined at the second side 115 of the body 111.

Figure 9:
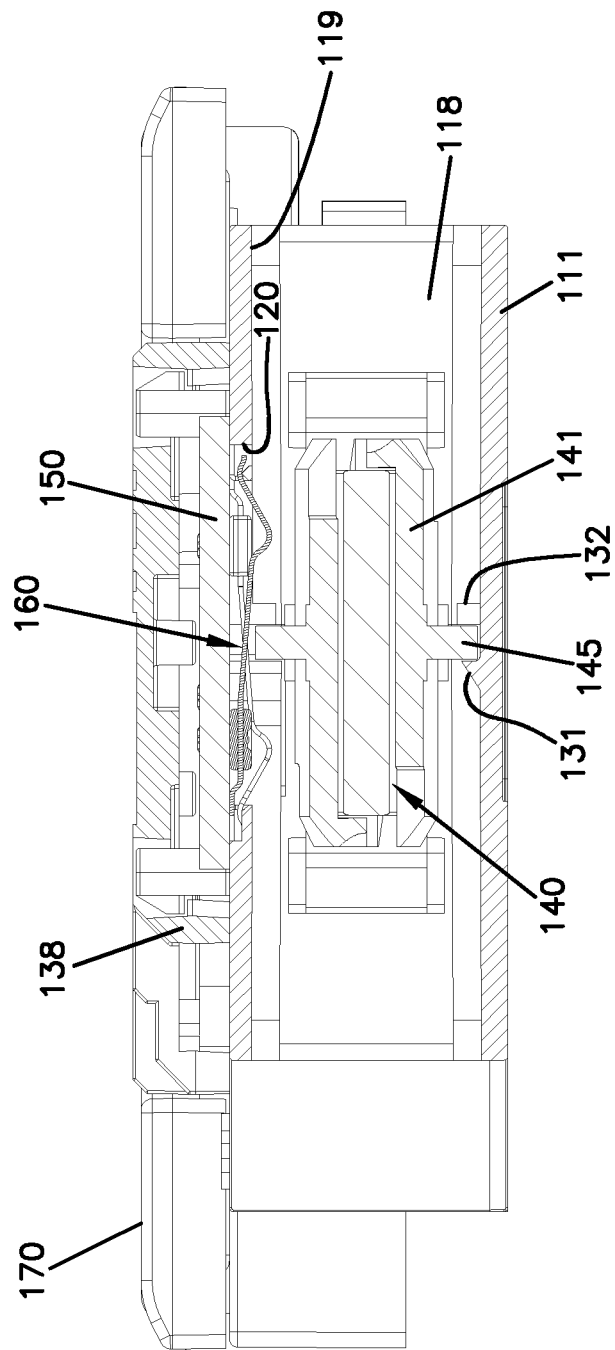
FIG. 9 is a cross-sectional view of the adapter block of FIG. 8 taken along the 9-9 line.
Figure 10:
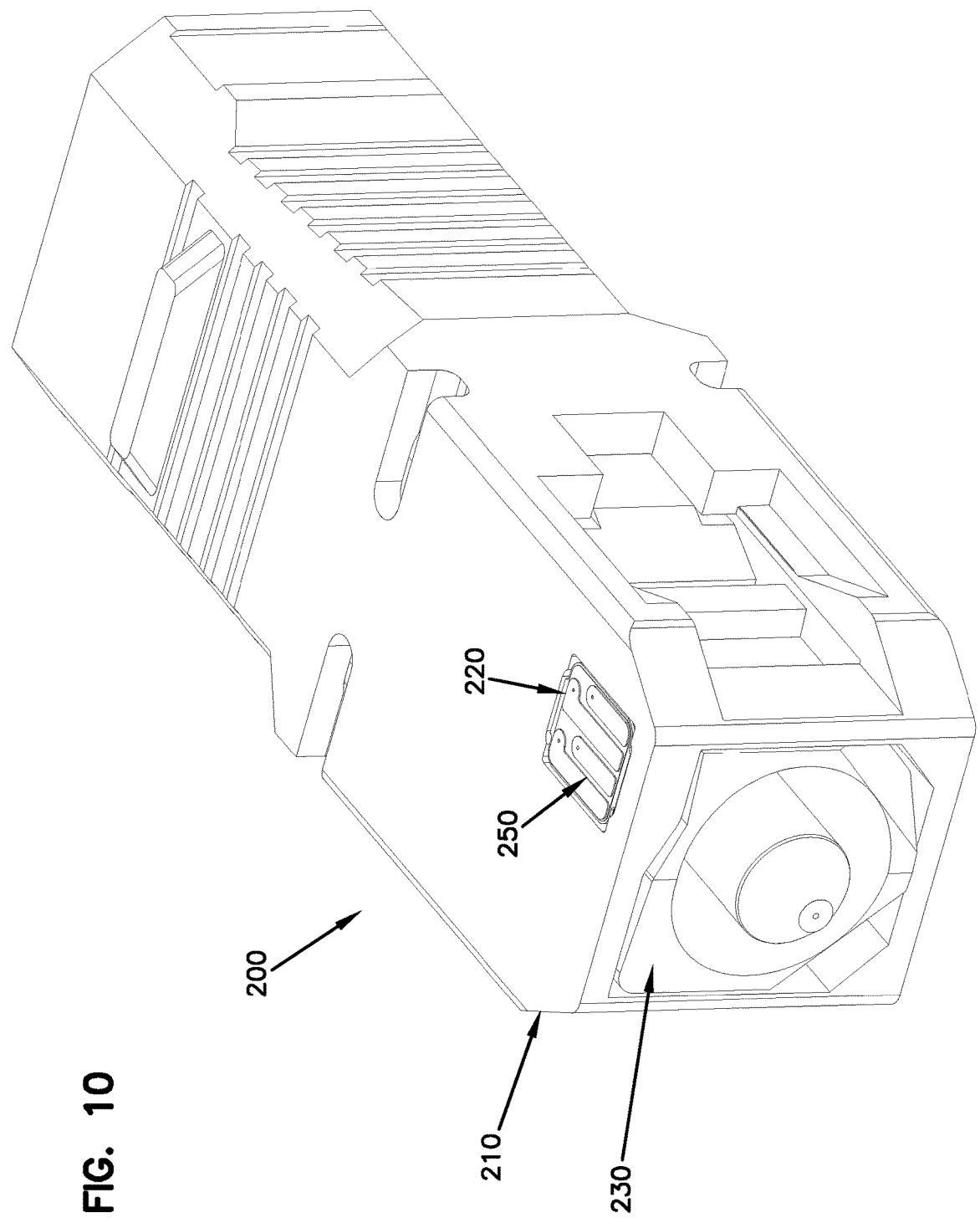
FIG. 10 is a perspective view of an example optical connector to which a storage device is coupled in accordance with the principles of the present disclosure.
Figure 11:
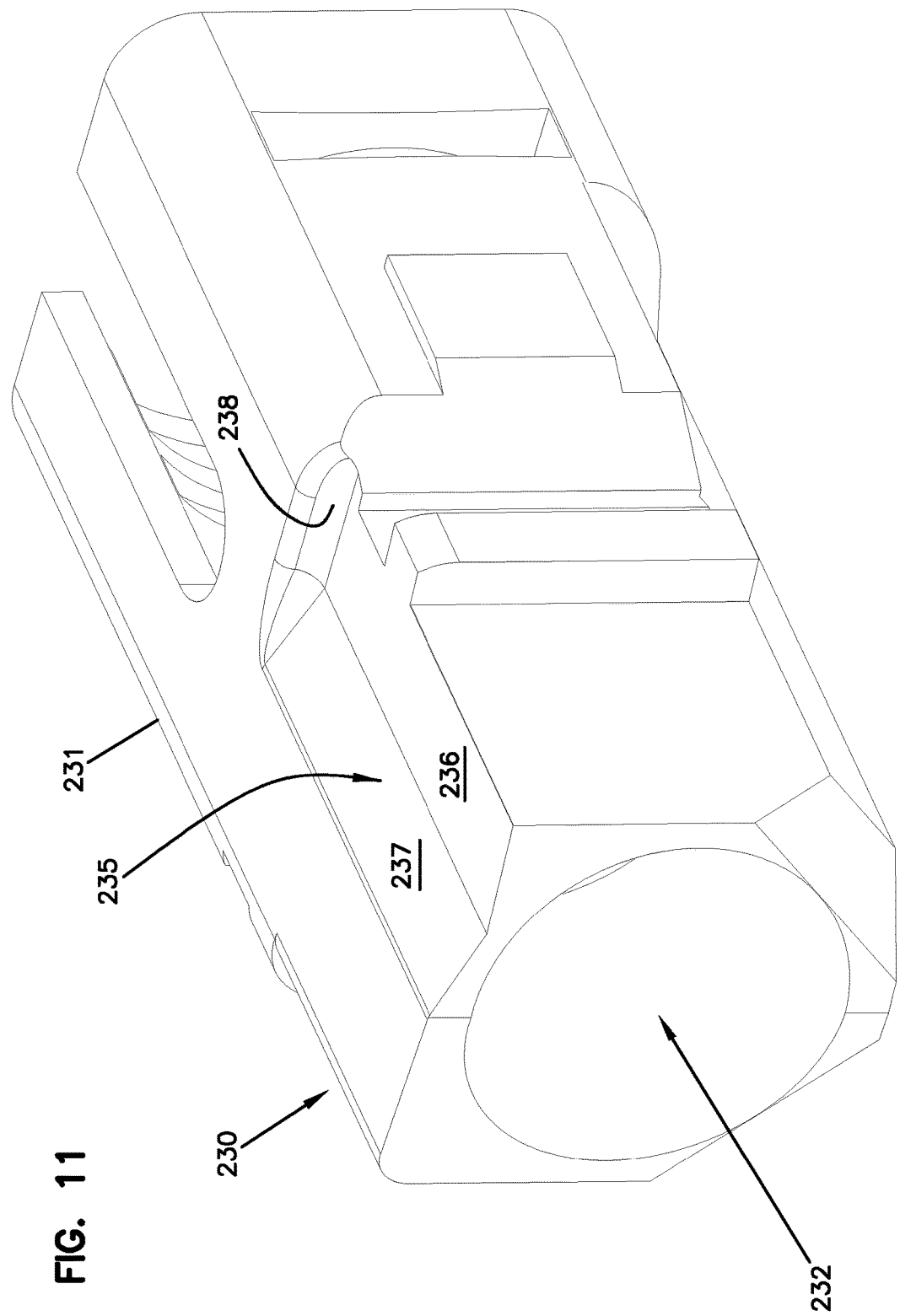
FIG. 11 is a perspective view of an example inner housing of the optical connector of FIG. 10.
Figure 16:
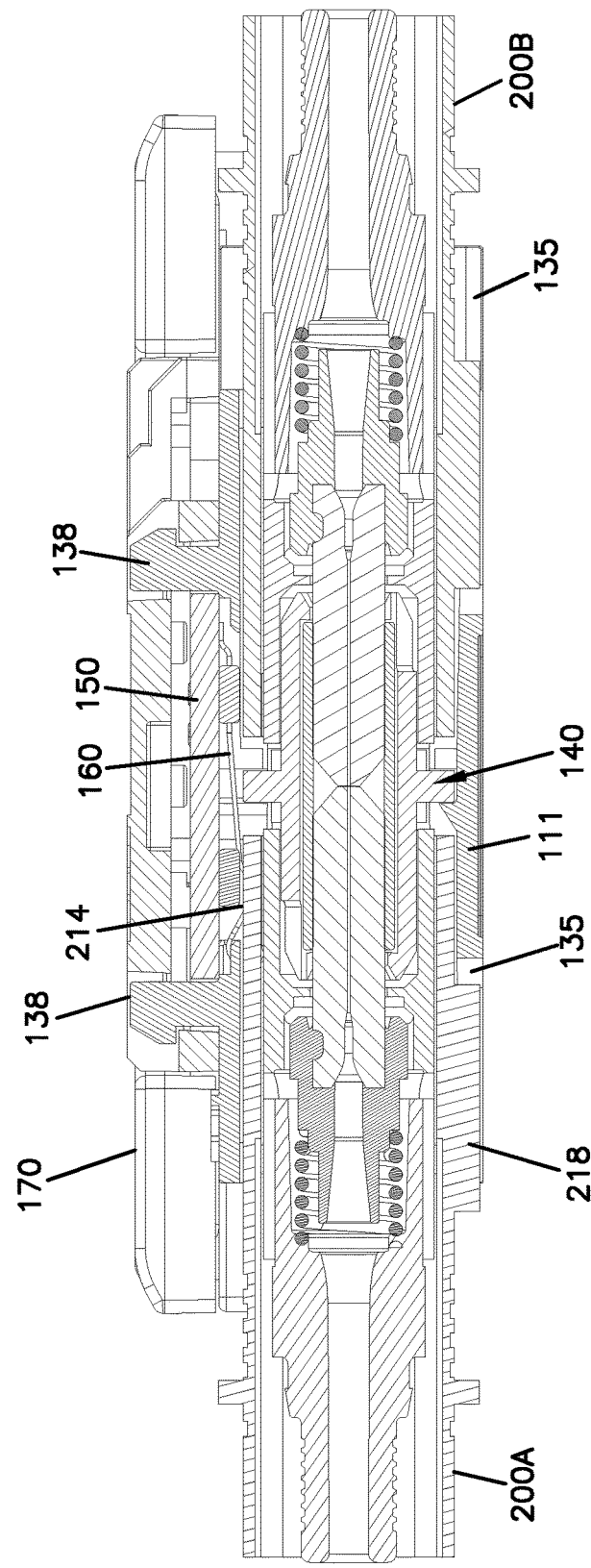
FIG. 16 is a cross-sectional view of the adapter block of FIG. 8 taken along the 16-16 line.

In some implementations, the adapter block body 111 is configured to receive one or more alignment arrangements 140 (FIGS. 9 and 16). Each alignment arrangement 140 is configured to align two optical connectors received at the ports 119 of a passage 118 in which the alignment arrangement 140 is disposed. The adapter block body 111 includes one or more first latching arrangements 125 disposed at the first side 114 of the body 111 and one or more second latching arrangements 130 disposed at the second side 115 of the body 111. Each first latching arrangement 125 cooperates with a corresponding second latching arrangement 130 to retain an alignment arrangement 140 against movement along an axis of the respective passage 118.

In certain implementations, each first latching arrangement 125 includes one or more flexible latching arms 126 opposing shoulders 127. In the example shown, each first latching arrangement 125 includes two latching arms 126 disposed at opposite sides of the respective aperture 120. The latching arms 126 extend from the first end 121 of the respective aperture 120 towards the second end 122. The shoulders 127 are disposed at an intermediate location along the aperture 120 and face the first end 121. In some examples, the latching arms 126 are configured to deflect/flex laterally along the aperture 120 (e.g., see FIG. 6). In other examples, the latching arms 126' are configured to deflect/flex outwardly from the respective aperture 120 away from the respective passage 118 (e.g., see some of the latch arms of FIG. 7).

In certain implementations, each second latching arrangement 130 includes a ramp member 131 and a stop member 132. In certain examples, each second latching arrangement 130 includes two stop members 132. In the example shown in FIG. 6, the ramp member 131 is disposed in the passage 118 and the stop members 132 are spaced from the ramp member 131 and positioned at opposite sides of the ramp member 131. A gap between the ramp member 131 and stop members 132 aligns with a gap between distal ends of the latching arms 126, 126' and the shoulders 127.

An alignment arrangement 140 includes a sleeve holder section 141 and a retention flange 145 (e.g., see FIG. 9). The alignment arrangement 140 is inserted into one of the passages 118 of an adapter block body 111 through one of the ports 119 and slid through the passage towards the latching arrangements 125, 130. As the alignment arrangement 140 is slid along the passage 118, the retention flange 145 of the alignment arrangement 140 rides over the ramp section 131 of the second latching arrangement 130 and deflects the latching arms 126, 126' of the first latching arrangement 125. The retention flange snaps over the ramp section 131 to be held between the ramp section 131 and the stops 132 of the second latching arrangement 130. The latching arms 126, 126' return to their undeflected positions to hold the retention flange against the shoulders 127.

As shown in FIG. 5, guide members 128 can be provided within the passages 118 to facilitate installation of the alignment arrangements 140. One or more guide members 128 extend along sidewalls of each passage 118. In the example shown, two guide members 128 extend along each sidewall of each passage 118. The guide members 128 define a groove or channel therebetween sized to receive a protrusion or ledge of the alignment device 140 to inhibit non-axial movement of the alignment device 140 (e.g., torquing movement through the aperture 120) during axial movement of the alignment device 140 through the passage 118. In certain implementations, the guide members 128 can have tapered ends 129. In the example shown, the guide members 128 have tapered forward ends 129.

In some implementations, a periphery of the adapter block 110 defined by the front 112, rear 113, and ends 116, 117 has a staggered configuration. Portions of the adapter block 110 extend forwardly of other portions of the adapter block 110 (e.g., see FIG. 6). In certain implementations, adjacent ports 119 are staggered forwardly/rearwardly relative to each other. The staggering of the ports 119 enhances access to individual connectors 200 received at the ports 119.

In certain implementations, apertures 120 of adjacent passages 118 are staggered relative to each other. For example, as shown in FIG. 6, a fixed end of the flexible latching arms 126 of one first latching arrangement 125A is disposed rearwardly of a distal end of the flexible latching arms 126 of an adjacent first latching arrangement 125B. In some implementations, staggering of the first latching arrangements 125A, 125B may inhibit interference between latching arms 126 of adjacent first latching arrangements 125. In other implementations, staggering of the first latching arrangements 125A, 125B may facilitate manufacturing of the latching arms 126 of adjacent first latching arrangements 125A, 125B.

Figure 8:
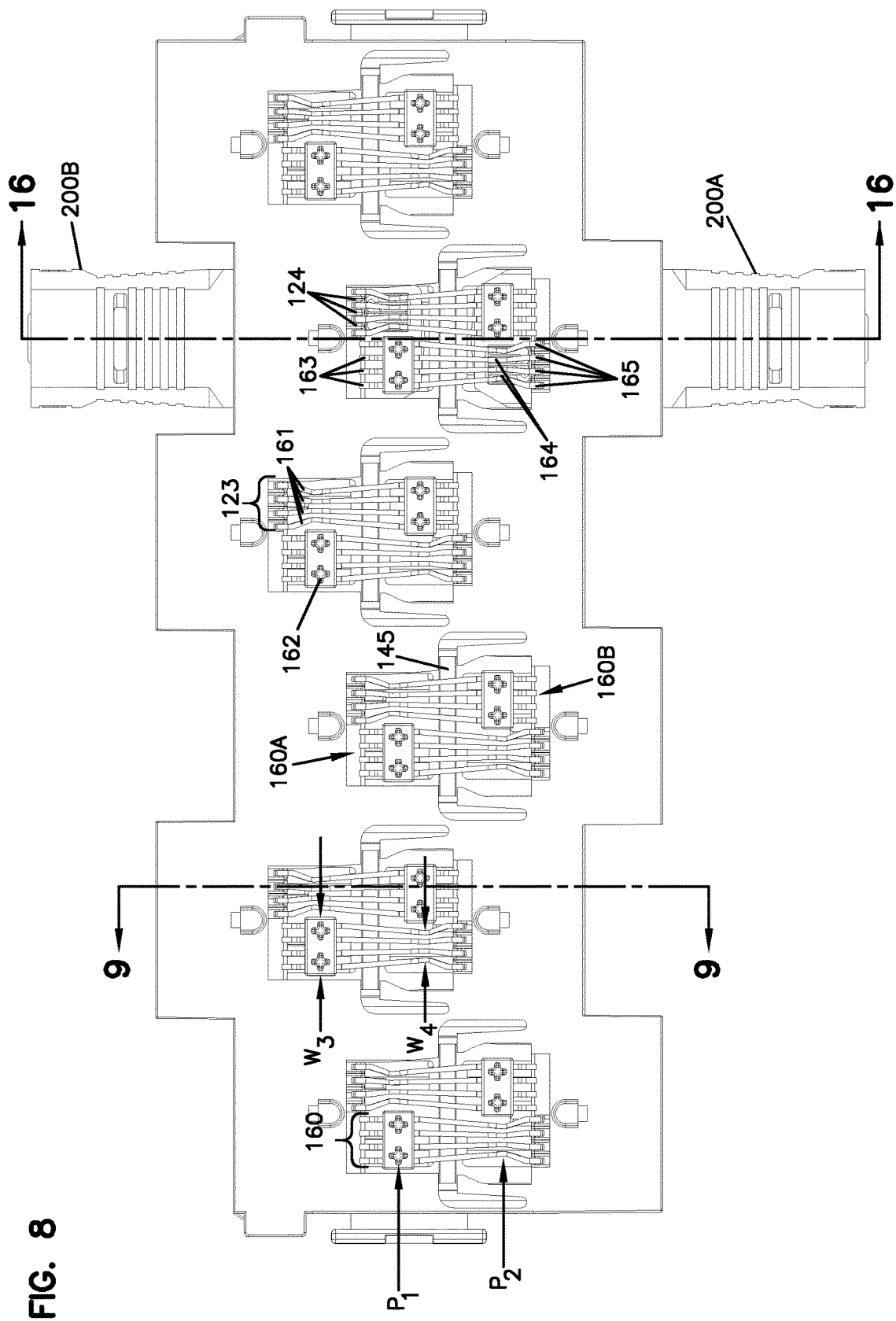
FIG. 8 shows contact sets added to the adapter block of FIG. 6 and two connectors plugged into opposing ports of the adapter block.

The first side 114 of the adapter body 111 is configured to receive one or more contact sets 160 at the apertures 120. Referring to FIG. 8, each contact set 160 includes one or more contact members 161 coupled together by a support body 162. In an example, the support body 162 is overmolded over a portion of each contact member 161. Each contact member 161 has a first contact region, a second contact region, and a third contact region. The first contact region is located at a first end of the contact member 161, the third contact region is located at an opposite second end of the contact member 161, and the second contact region is located intermediate the first and second regions.

The first contact region is fixed to a contact pad on the circuit board 150. The second contact region engages a connector 200 when the connector 200 is received at a port 119 of the respective passage 118. The third contact region is deflected against a second contact pad on the circuit board 150 when the second contact region engages the connector 200. The third contact region is spaced from the second contact pad when the connector 200 is not received at the port 119. Additional information about example contact sets 160 can be found in U.S. Provisional Application No. 61/843,733, filed Jul. 8, 2013, and titled "Optical Assemblies with Managed Connectivity," the disclosure of which is hereby incorporated herein by reference.

The contact members 161 of each contact set 160 extend along a length of the contact set 160. The contact members 161 are shaped and arranged so that the contact set 160 has a first width W3 at a first point P1 along the length of the contact set 160 and a second width W4 at a second point P2 along the length of the contact set 160 with the second width W4 being less than the first width W3. In an example, the first width W3 is a maximum width of the contact set 160 and the second width W4 is a minimum width of the contact set 160. In an example, the first and second widths W3 and W4 are less than a width W1 of the aperture 120.

In some implementations, two contact sets 160A, 160B are disposed at each aperture 120. In certain examples, the two contact sets 160A, 160B have different orientations. In an example, a first contact set 160A has a first orientation and a second contact set 160B has a second orientation that is rotated 180° relative to the first orientation. In certain examples, the contact sets 160 are disposed so that the first point P1 of the first contact set 160A laterally aligns with the second point P2 of the second contact set 160B (e.g., see FIG. 8).

Figure 17:
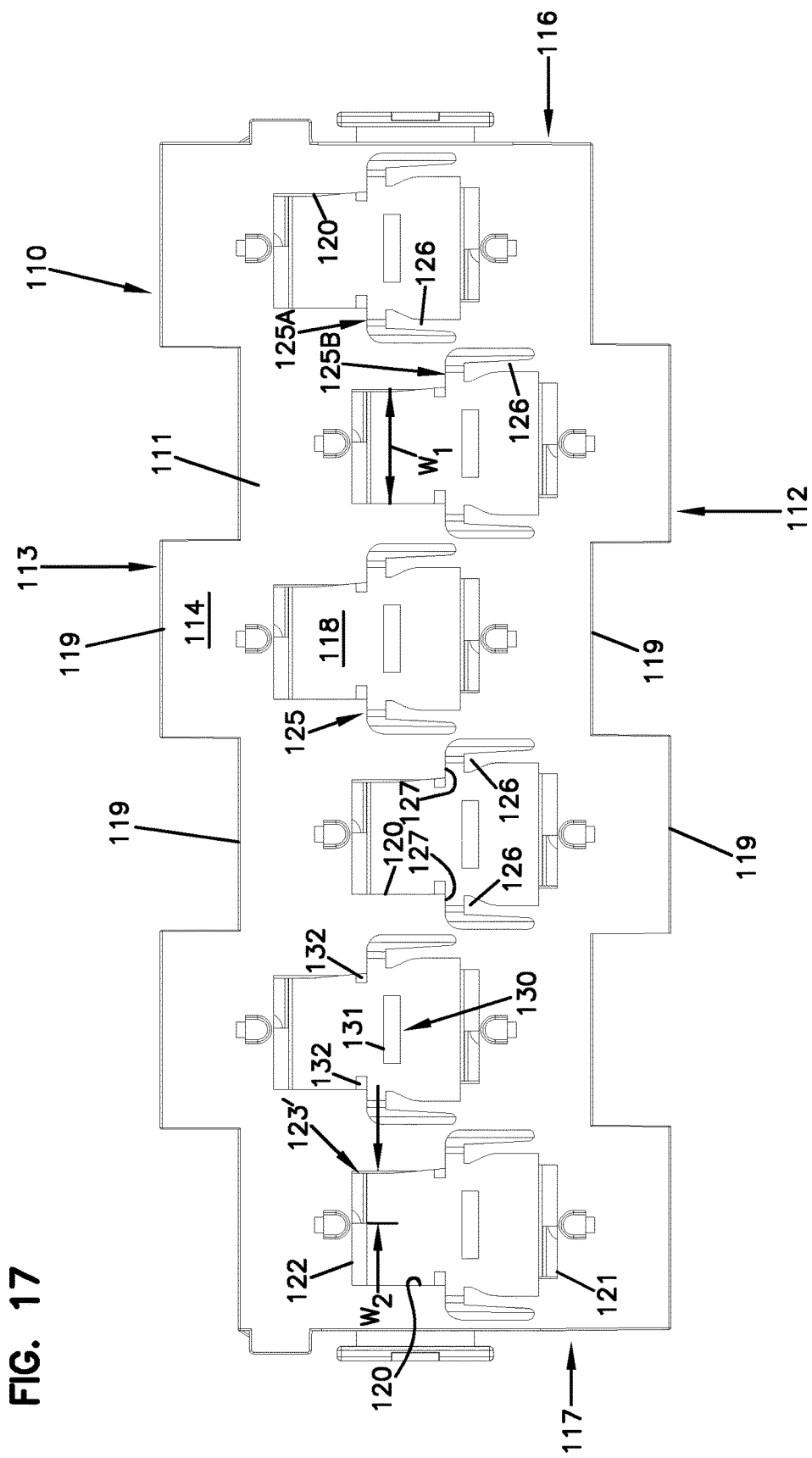
FIG. 17 is a top plan view of another example adapter block configured in accordance with the principles of the present disclosure.

In some implementations, the ends 121, 122 of the apertures 120 define slotted regions 123 at which the second ends of the contact members 161 are disposed (see FIG. 6). In certain implementations, the slotted regions 123 include one or more ribs 124 that define separate contact member receiving spaces. The ribs 124 are configured and arranged to extend between adjacent contact members 161 to inhibit engagement of the contact members 161 during deflection of the third contact surface. In other implementations, the ends 121, 122 of the aperture 120 define slots 123' at which ends of the contact members 161 can be received. The slots 123' extend at least partially across the respective end 121, 122 (see FIG. 17). In certain examples, the slot 123' is a closed-ended slot. In certain examples, no ribs or other structures extend over the slot 123'.

In certain examples, the slotted regions 123 or slots 123' extend across no more than half the width of the end 121, 122. In certain examples, the slotted regions 123 or slots 123' extend across less than half the width of the end 121, 122. In some implementations, the slotted regions 123 or slots 123' have widths W2 (FIG. 6) that extend across less than the width W1 of the aperture 120. In certain implementations, the widths W2 of the slotted regions 123 or slots 123' extend across less than a majority of the width W1 of the aperture 120. In certain implementations, the widths W2 extend across less than half of the width W1 of the aperture 120.

FIGS. 10-15 illustrate one example optical connector 200 suitable for implementing any of the connector arrangements 20, 30 of FIG. 1. The optical connector 200 includes an outer housing 210 and an inner housing 230 that is slidably moveable within a passage 212 defined in the outer housing 210. The inner housing 230 has a body 231 configured to hold an end of an optical fiber within a passage 232 (see FIG. 11). For example, certain types of inner housings 230 are configured to retain optical ferrules, which hold the ends of the optical fibers.

Figure 12:
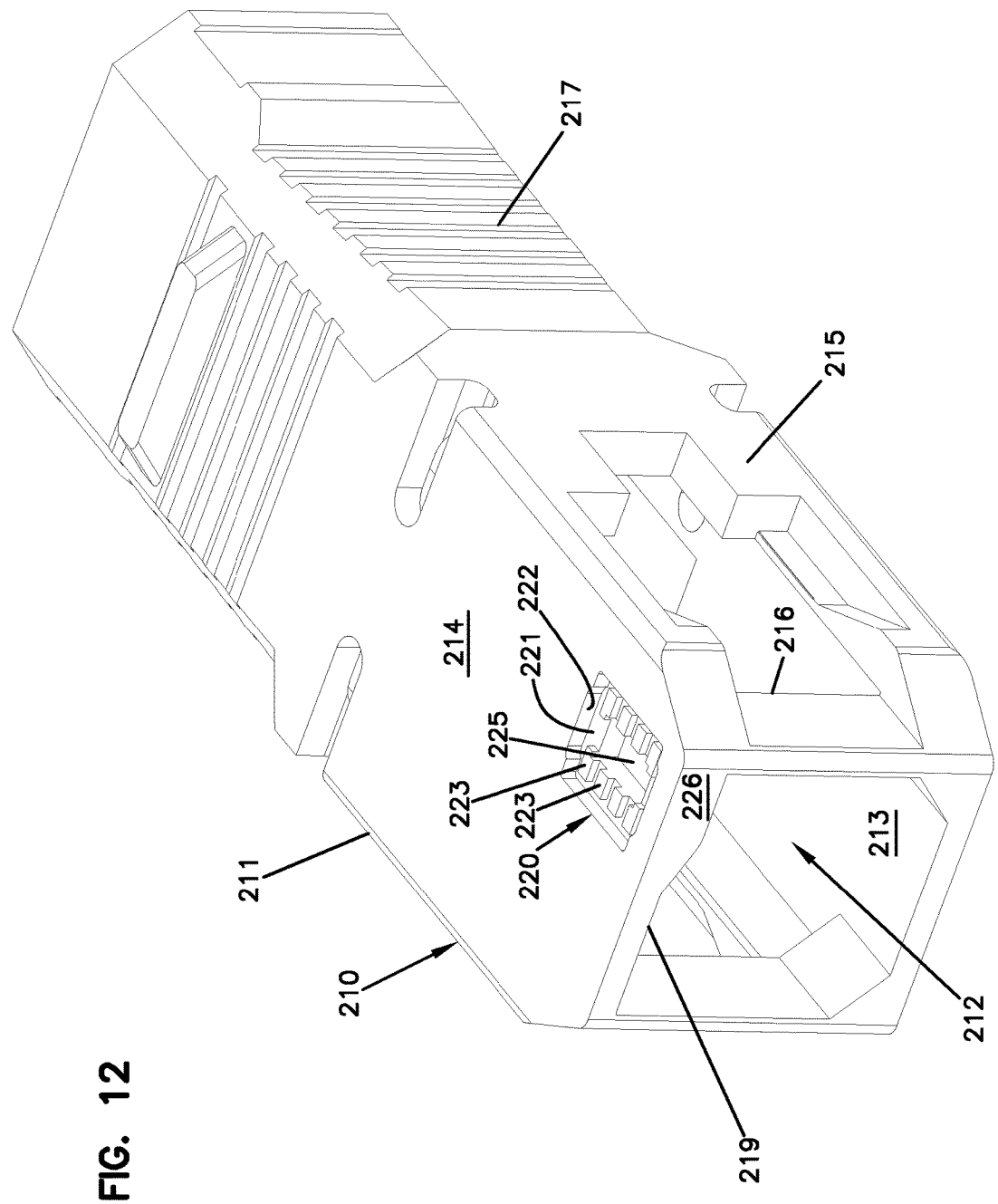
FIG. 12 is a perspective view of an example outer housing of the optical connector of FIG. 10.
Figure 13:
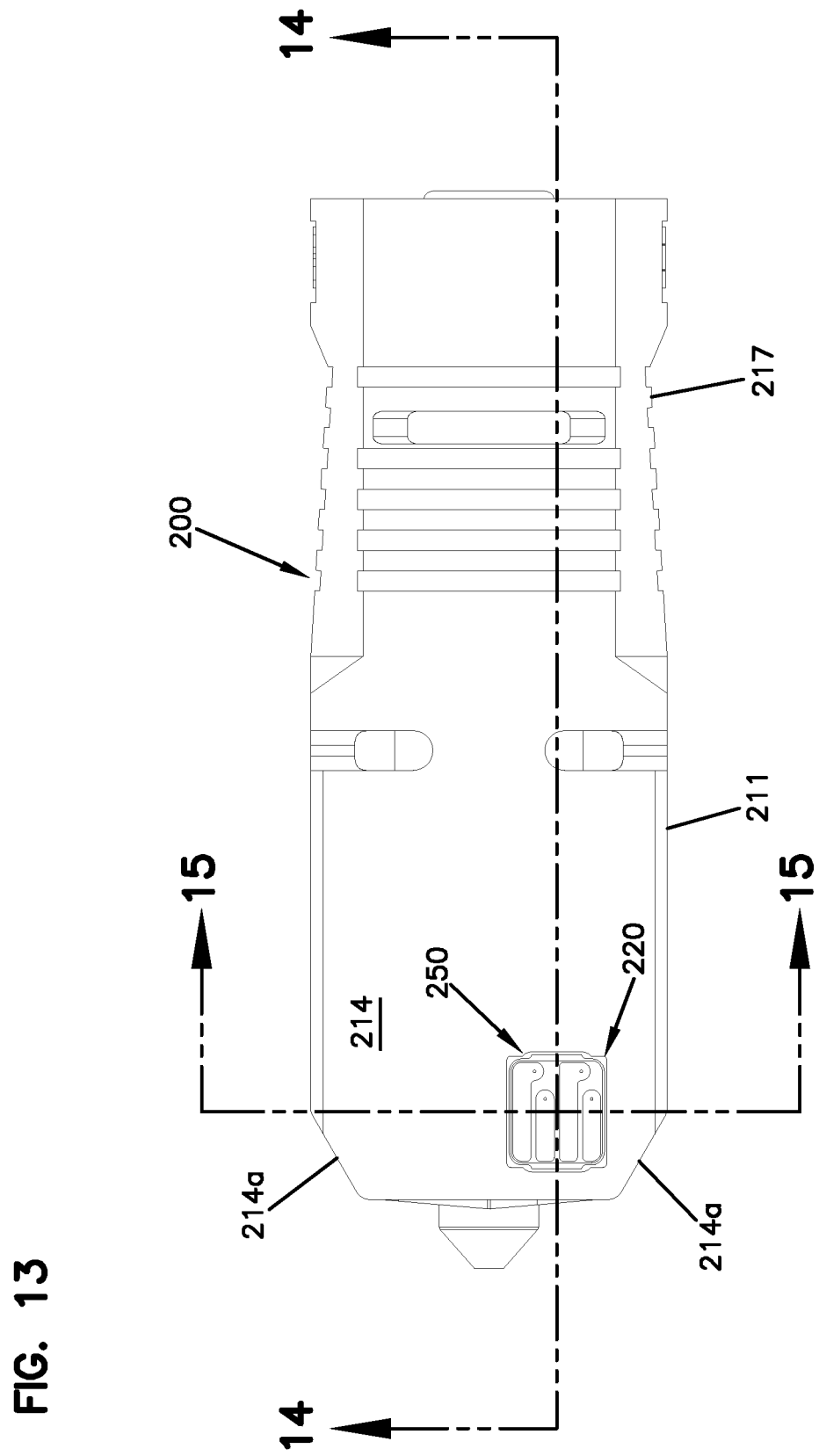
FIG. 13 is a top plan view of the optical connector of FIG. 10.

The outer housing 210 includes a body 211 defining a passage 212 in which the inner housing body 231 can slide (see FIG. 12). The body 211 includes a first side 214, an opposite second side 213, and sidewalls 215 extending therebetween. A forward portion of the sidewalls 215 defines apertures 216 at which the connector 200 can be held by the alignment arrangement 140 within the adapter block 110 (see FIG. 16). A rearward portion of the body 211 defines a grip region 217. The second side 213 of the body 211 includes a key In some implementations, a storage device 250 can be coupled to the connector 200. The storage device 250 includes electronic memory 256 or another type of memory that stores information pertaining to the connector 200 and/or the optical fiber terminated thereby. In certain implementations, the electronic memory 256 of the storage device 250 is mounted to a circuit board 252. Contact pads 254 that provide electrical access to the memory 256 also can be disposed on the circuit board 252. In certain implementations, the contact pads 254 are disposed at one major surface of the circuit board 252 and the electronic memory 256 is disposed at an opposite major surface of the circuit board 252.

The outer housing body 211 defines a storage mounting region 220 at which the storage device 250 can be disposed. As shown in FIG. 12, the outer housing body 211 defines an aperture 222 at the first side 214. The aperture 222 provides access to a recessed surface 221 at the storage mounting region 220. In certain implementations, a further recess 225 is defined in the recessed surface 221. The further recess 225 extends into the outer housing body 211 towards the passage 212 defined through the body 211. In certain examples, the further recess 225 has a closed bottom.

In some implementations, the body 211 defines the storage mounting region 220 at the first side 214 and towards a front of the body 211. In some implementations, the storage mounting region 220 is laterally offset from a central, longitudinal axis of the outer housing body 211 (see FIG. 13). In certain implementations, the storage mounting region 220 is sufficiently laterally offset so that no portion of the storage device 250 extends over the central, longitudinal axis of the outer housing body 211. Tapered surfaces 214a are provided at the front of the first side 214. In certain implementations, the storage mounting region 220 is sufficiently laterally offset from the sidewalls 215 to not axially overlap with the tapered surfaces 214a (see FIG. 13).

In some implementations, the outer housing body 211 has an area of increased thickness 226 at the storage mounting region 220. An inner surface 219 of the body 211 extends into the passage 212 at the area of increased thickness 226. For example, a portion of the inner surface 219 of the first side 214 may angle downwardly into the passage 212. In another example, a portion of the inner surface 219 may step inwardly to protrude into the passage 212. The increased thickness 226 provides sufficient material for the outer housing body 211 to accommodate the further recess 225. For example, the further recess 225 may have a depth that is greater than a thickness of the outer housing body 211 at the first side 214 outside the area of increased thickness 226. In certain implementations, the increased thickness 226 also aids in accommodating the recessed surface 221. For example, the recessed surface 221 may have a depth that is greater than a thickness of the outer housing body 211 at the first side 214 outside the area of increased thickness 226.

The inner housing 230 is shaped and configured to accommodate the storage mounting region 220 of the outer housing 210. For example, the inner housing body 231 defines a channel 235 that accommodates the increased thickness 226 of the outer housing body 211. The contour of the inner surface 219 at the storage mounting region 220 generally matches the contour of the channel 235. Accordingly, the region of increased thickness and the storage device 250 slide along the channel 235 as the inner housing body 231 slides within the outer housing body 211.

The channel 235 extends rearwardly from a front end of the inner housing body 231. In certain examples, the channel 235 extends over less than half a length of the inner housing body 231. The channel 235 defines a recessed surface 236 and a transition surface 237 that extends from the recessed surface 236 to an exterior surface of the inner housing body 231. In certain examples, the recessed surface 236 extends to one side of the inner housing body 231 so that a corner of the inner housing body 231 is eliminated. An end surface 238 terminates a rear end of the channel 235.

Figure 15:
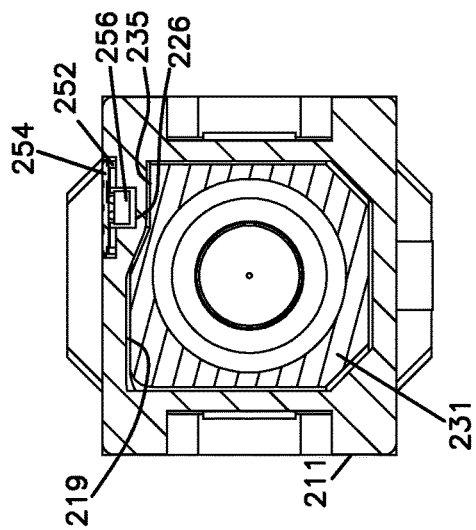
FIG. 15 is a transverse cross-sectional view of the optical connector of FIG. 10 taken along the 15-15 line of FIG. 13.
Figure 14:
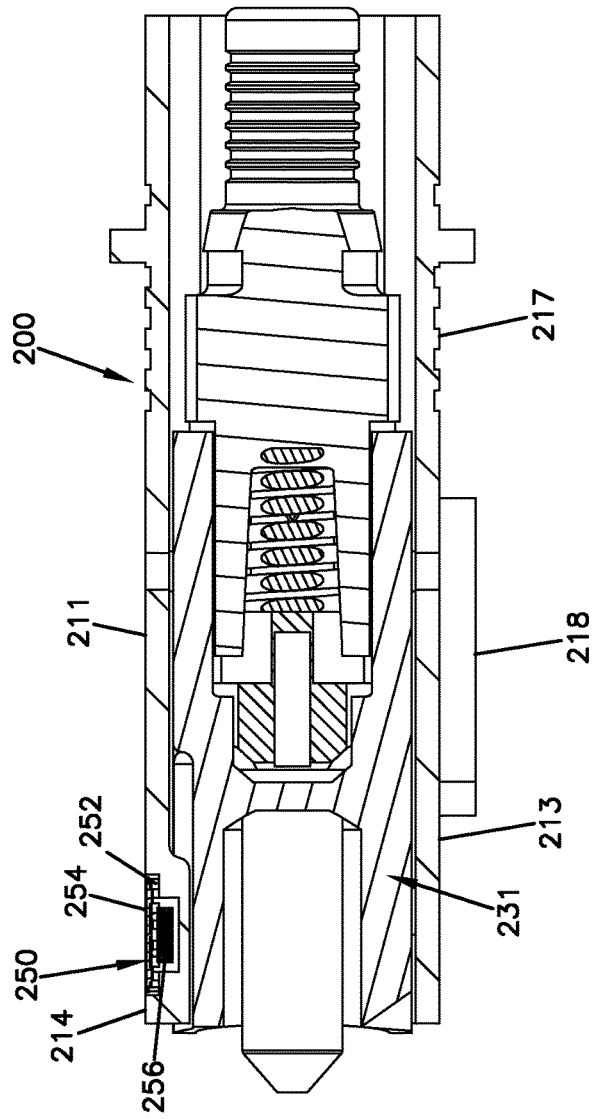
FIG. 14 is a longitudinal cross-sectional view of the optical connector of FIG. 10 taken along the 14-14 line of FIG. 13.

In certain implementations, the circuit board 252 of the storage device seats on the recessed surface 221 (e.g., see FIGS. 14 and 15). In certain implementations, the circuit board 252 seats on ribs 223 (FIG. 12) extending upwardly from the recessed surface 221. In certain examples, the contact pads 254 of the storage device 250 are no higher than flush with an exterior of the first side 214. In certain examples, the contact pads 254 of the storage device 250 are recessed within the first side 214. In certain implementations, the electronic memory 256 is accommodated by the further recess 225.

In certain implementations, storage mounting region 220 is only accessible through the open top 222. In certain examples, the inner surface 219 of the first side 214 extends fully between the electronic memory 256 and the inner housing body 231. In certain examples, the inner surface 219 of the first side 214 extends fully between the storage device 250 and the inner housing body 231.

FIG. 16 shows two optical connectors 200A, 200B plugged into opposite ports 119 of the adapter block assembly 100. The first side 214 of each connector 200A, 200B engages the second contact surfaces of the respective contact set 160. Insertion of the connectors 200A, 200B into the ports 119 causes deflection of the third contact surfaces of the contact sets 160 towards the circuit board 150. In certain examples, engagement between the third contact surfaces and the circuit board 150 completes a circuit to indicate the presence of a connector at the port. In certain examples, engagement between the third contact surfaces and the circuit board 150 shorts a circuit to indicate the presence of a connector at the port. In certain examples, engagement between the third contact surfaces and the circuit board 150 completes a circuit to enable information to be obtained from the storage device 250 on the connector 200.

Additional information about how physical layer information can be read from the plug connectors by the contact assemblies at the adapters can be found in U.S. Publication No. 2011-0262077, the disclosure of which is hereby incorporated herein by reference.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An adapter assembly comprising:
   at least a first adapter block having a first side and a second side, the first adapter block defining at least a first passage, each passage extending between a front port and a rear port, the first side of the first adapter block defining at least a first aperture providing access between the first passage and an exterior of the first adapter block;
   a circuit board disposed at the first side of the first adapter block so that the circuit board extends across the first aperture;
   a first contact set disposed in the first aperture, the first contact set having a first orientation; and
   a second contact set disposed in the first aperture, the second contact set having a second orientation that is rotated 180° from the first orientation.

2. The adapter assembly as claimed in claim 1, wherein the second contact set has an identical configuration to the first contact set.

3. The adapter assembly as claimed in claim 1, wherein each contact set has a first width at a first longitudinal point and a second width at a second longitudinal point spaced from the first longitudinal point, the second width being less than the first width.

4. The adapter assembly as claimed in claim 3, wherein the first longitudinal point of the first contact set is laterally aligned with the second longitudinal point of the second contact set when the contact sets are disposed at the first aperture.

5. The adapter assembly as claimed in claim 1, wherein the first and second contact sets each include multiple contact members.

6. The adapter assembly as claimed in claim 5, wherein the first aperture has a first longitudinal end and a second longitudinal end, and wherein at least a portion of each longitudinal end defines a slotted region including ribs defining separate contact member receiving spaces.

7. The adapter assembly as claimed in claim 5, wherein the first aperture has a first longitudinal end and a second longitudinal end, and wherein at least a portion of each longitudinal end defines a single slot.

8. The adapter assembly as claimed in claim 1, wherein the first adapter block defines a plurality of additional passages, the first side of the first adapter block defining a plurality of additional apertures, each additional aperture providing access between one of the additional passages and the exterior of the first adapter block; wherein the circuit board extends across the additional apertures; and wherein the adapter assembly further comprises additional first contact sets disposed at the additional apertures, the additional first contact sets having first orientations; and additional second contact sets disposed at the additional apertures, the additional second contact sets having second orientations that are rotated 180° from the first orientations of the additional first contact sets.

9. The adapter assembly as claimed in claim 1, further comprising:
   at least a second adapter block having a first side and a second side, the second adapter block defining at least a first passage, each passage extending between a front port and a rear port, the first side of the second adapter block defining at least a first aperture providing access between the first passage and an exterior of the second adapter block;
   a third contact set disposed at the first aperture of the second adapter block, the third contact set having a first orientation; and
   a fourth contact set disposed at the first aperture of the second adapter block, the fourth contact set having a second orientation that is rotated 180° from the first orientation of the third contact set.

10. The adapter assembly as claimed in claim 9, further comprising a second circuit board disposed over the second adapter block.

11. The adapter assembly as claimed in claim 9, wherein the first circuit board extends over the second adapter block.

* * * * *